United States Patent [19]

Gorchev et al.

[11] 4,313,522
[45] Feb. 2, 1982

[54] STATIC PRESSURE REGAIN COUPLER FOR AN AIR DISTRIBUTION SYSTEM

[75] Inventors: Dimiter Gorchev, Boston, Mass.; Karl U. Ingard, Kittery Point, Me.

[73] Assignee: Mitco Corporation, Somerville, Mass.

[21] Appl. No.: 73,604

[22] Filed: Sep. 10, 1979

Related U.S. Application Data

[63] Continuation-in-part of Ser. No. 944,133, Sep. 20, 1978, Pat. No. 4,182,430.

[51] Int. Cl.³ .............................................. E04F 17/04
[52] U.S. Cl. .................................. 181/224; 181/256; 181/268; 98/DIG. 10
[58] Field of Search ............... 181/224, 256, 268, 275, 181/282, 239, 218; 98/40 B, 40 C, 40 VM, DIG. 10, 38

[56] References Cited

U.S. PATENT DOCUMENTS

| | | | |
|---|---|---|---|
| 2,295,251 | 9/1942 | Buker | 98/38 |
| 2,308,886 | 1/1943 | Mason | 181/224 |
| 3,507,354 | 4/1970 | Dieckmann et al. | 181/224 |
| 3,554,112 | 1/1971 | Herb | 181/224 X |
| 3,696,731 | 10/1972 | Tutt | 181/239 X |
| 3,965,933 | 6/1976 | Beaudin | |
| 4,050,364 | 9/1977 | Maus | 181/224 X |

FOREIGN PATENT DOCUMENTS

| 1683572 | 7/1967 | Fed. Rep. of Germany . |
| 2266780 | 10/1975 | France . |

Primary Examiner—Joseph W. Hartary
Assistant Examiner—Benjamin R. Fuller
Attorney, Agent, or Firm—Kenway & Jenney

[57] ABSTRACT

A static pressure regain coupler for coupling an input duct and the upstream end of a branch take-off device having a main duct and one or more channel. The static pressure regain (SPR) coupler includes an upstream end which has substantially the same cross-section as the input duct. The SPR coupler also includes a downstream end which has a first port having the same cross-section as the main duct of the take-off device, and a second port having substantially the same cross-section as the channels of the take-off device. The SPR coupler is adapted to couple most of the input airflow to the take-off main duct, and a minor portion of that air flow to the take-off channels.

11 Claims, 13 Drawing Figures

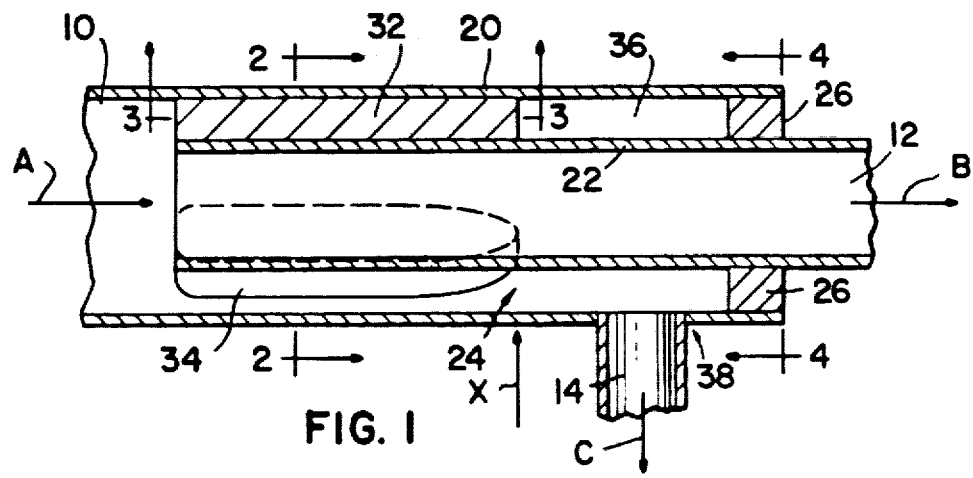
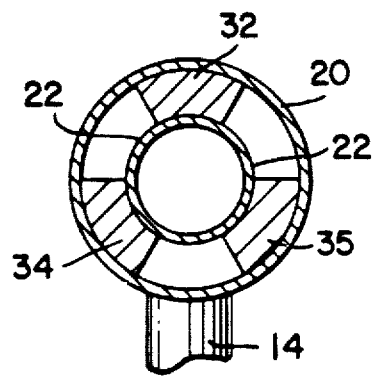
FIG. 2
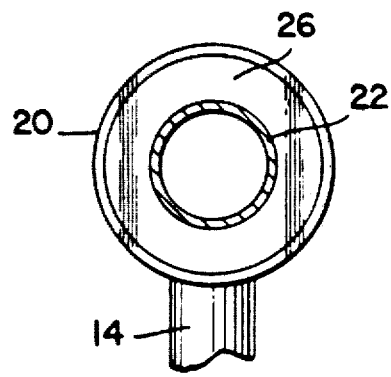
FIG. 4
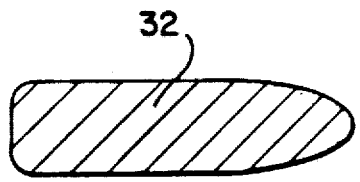
FIG. 3

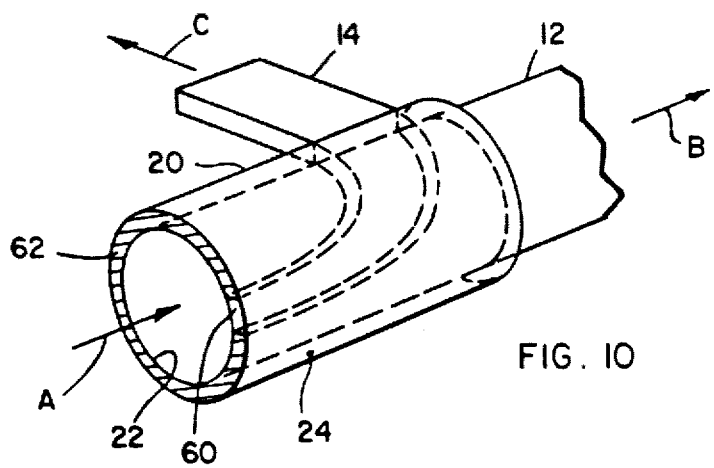
FIG. 10
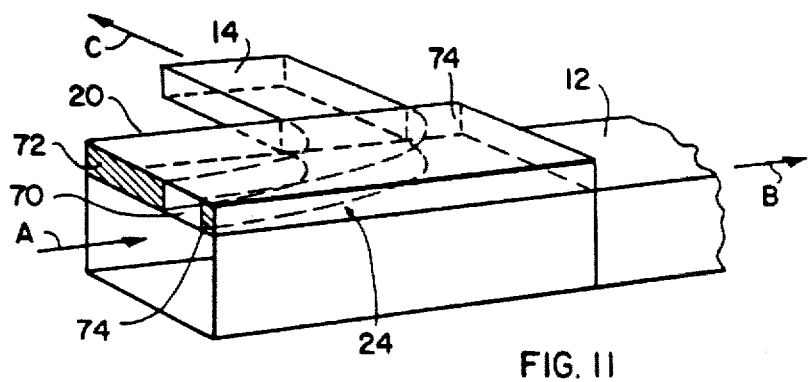
FIG. 11
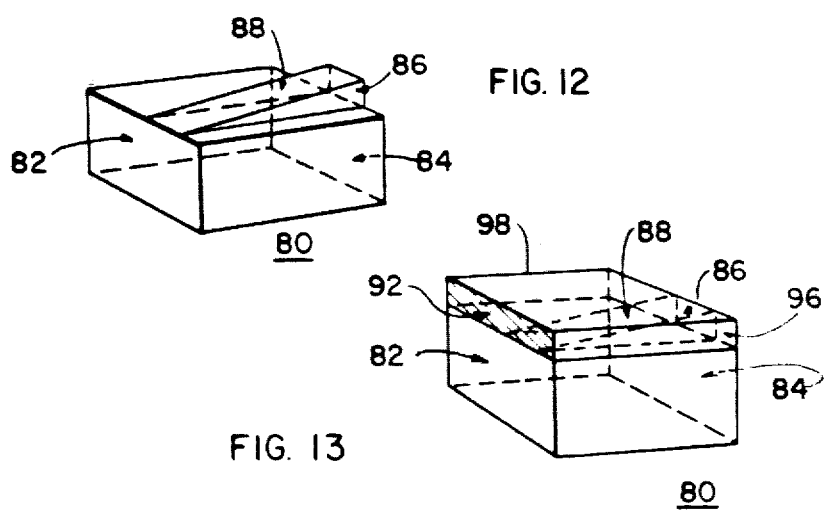
FIG. 12
FIG. 13

STATIC PRESSURE REGAIN COUPLER FOR AN AIR DISTRIBUTION SYSTEM

CROSS REFERENCE TO RELATED APPLICATION

This application is a continuation-in-part of U.S. patent application Ser. No. 944,133, filed Sept. 20, 1978, now U.S. Pat. No. 4,182,430. This application is also related to U.S. patent application Ser. No. 073,603, filed on even data herewith, now abandoned and which is a continuation-in-part of Ser. No. 944,133.

BACKGROUND OF THE INVENTION

This invention relates to air distribution systems and more particularly to apparatus for extracting air from a main supply duct to a branch duct.

In a conventional air distribution system in a building, the air is branched from the main air supply duct to the various branch ducts through openings in the wall of the main duct which enter into the branch ducts.

Generally, the volume flow rate through the branch is determined by the static pressure in the main duct and the flow resistance of the branch. Since the branch opening is flush with the wall of the main duct, the dynamic pressure of the flow in the main duct does not contribute to the flow rate in the branch.

In such configurations, the noise level at the entrance to the branch duct is substantially the same as the noise level in the main duct. This level is generated mainly by the air supply fan, which noise travels through the main air duct without much attenuation. In the prior art, to reduce the noise level, a silencer is typically used at the exit of the fan in the main supply duct. Frequently a silencer is also incorporated at the inlet to the main supply fan.

In order to minimize the effects of the silencer on the system, the silencer must have a low pressure drop and its total open area must be large. Thus, if adequate acoustic attenuation is to be achieved, the silencer dimensions must be made quite large. This means that the silencer has the disadvantage, not only of being costly, but also bulky, requiring a large amount of space. If the dimensions of the silencer are reduced, the pressure drop will increase and it may then be necessary to select a larger fan to achieve the required total volume flow rate through the main duct. This latter alternative is extremely costly from an energy standpoint.

In order to further attack the noise problem, silencers may be introduced in the branch ducts, or alternatively, the branch ducts may incorporate noise attenuating liners. It should be kept in mind, however, that in order for such a silencer or liner to be effective at low frequencies, the absorptive elements must be quite thick, and in order for the pressure drop in the branches to be kept to an appropriately low value, the dimensions must be correspondingly large. This leads to impractical distribution systems.

It is an object of the present invention to provide a static pressure regain coupler for use with a branch take-off and silencer.

It is a further object to provide a composite branch duct take-off and silencer having a static pressure regain coupler.

It is another object to provide a composite branch take-off and silencer and associated static pressure regain coupler, eliminating the need for a silencer at the fan.

Yet another object is to provide a composite branch take-off and silencer and associate static pressure regain coupler providing relatively high air handling capacity and the volume flow in a branch duct.

SUMMARY OF THE INVENTION

Briefly, the present invention is a composite branch take-off and silencer for an air distribution system wherein an airstream from an input duct may be coupled to an output duct and one or more branch ducts. Inner and outer sections define a shell region. The shell region is closed at its downstream end and is adapted at its upstream end to receive oncoming air from the input duct. Porous acoustical material is positioned within the shell region to establish one or more channels in that region which extend from the upstream end to points adjacent to one or more of the branch ducts. At these points, the channels are coupled to one or more of the branch ducts. The downstream end of the inner section is coupled to the output duct.

A static pressure regain coupler provides coupling between the input duct and the upstream end of the branch take-off and silencer (TO/S) device. The static pressure regain (SPR) coupler includes an upstream end which has substantially the same cross-section as the input duct. The SPR coupler also includes a downstream end which has a first port having the same cross-section as the TO/S inner section, and a second port having substantially the same cross-section as the shell region channels of the TO/S device. The SPR coupler is adapted to couple most of the input airflow to the TO/S inner section, and a minor portion of that air flow to the TO/S channels. The static pressure regain coupler may be a discrete element for coupling between the input duct and the TO device, or it may be integral with the TO device. With this configuration, the airflow velocity decreases as the flow passes from the input duct to the output duct, resulting in a static pressure gain.

BRIEF DESCRIPTION OF THE DRAWING

The foregoing and other objects of this invention, the various features thereof, as well as the invention itself, may be more fully understood from the following description when read together with the accompanying drawing in which:

FIG. 1 shows a sectional view of an embodiment of the present invention;

FIGS. 2–4 show sectional views of the embodiment of FIG. 1;

FIGS. 3 and 4 show sectional views of an alternative embodiment of the present invention;

FIGS. 10 and 11 show perspective views of additional embodiments of the present invention; and FIGS. 12 and 13 show perspective views of exemplary static pressure regain couplers adapted for use with the embodiment of FIG. 11.

DESCRIPTION OF THE PREFERRED EMBODIMENT

Figure 5:
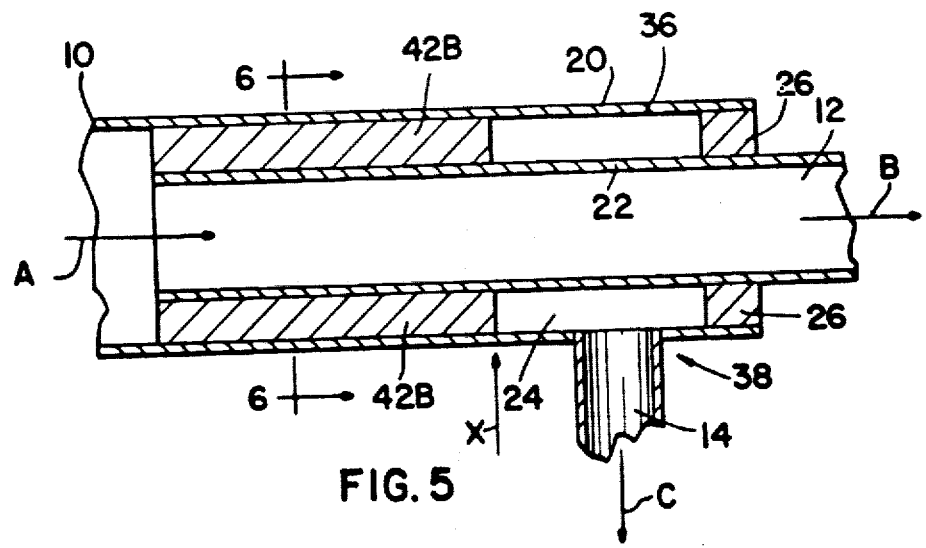
FIGS. 5–9 show sectional views of other embodiments of the present invention.

FIG. 1 shows an examplary branch take-off and silencer for air distribution system having an input duct 10, an output duct 12 and a branch duct 14. Airflow through the apparatus of FIG. 1 is indicated by the arrows A, B and C in that figure. FIGS. 2, 3 show sectional views of the elements of FIG. 1. The elements in FIGS. 2–4 which correspond to elements in FIG. 1 are identified by identical reference numerals.

Ducts 10 and 12 have similar, i.e. same shape, cross-sections. In this example, cross-sections are circular, with the input duct having a relatively large cross-section compared with the output duct. The ducts 10 and 12 are substantially coaxial at the ends to be coupled. In the illustrated embodiment, ducts 10 and 12 overlap. The overlapping portion of duct 10 is referred to hereinafter as the outer section 20 of the invention. The overlapped portion of duct 12 is referred to hereinafter as the inner section 22 of the invention. In the present embodiment, inner and outer sections 20 and 22 are formed by extensions of the respective ducts 10 and 12. In alternative embodiments, sections 20 and 22 may be separate from the ducts 10 and 12 but joined to the respective ducts at the point of overlap.

The shell region between the sections 20 and 22 is referred to generally by reference designation 24 in FIG. 1. In the present embodiment, the shell region 24 is annular. An annular plug 26 provides a seal to the shell region at the downstream end of that region. Plug 26 is a porous acoustical material such as glass wool.

The annular shell region 24 is open at its upstream end to be oncoming airflow in the input duct 10 (indicated by arrow A). The airflow in the shell region 24 exits to the branch duct 14 near the downstream end of region 24. In the illustrated embodiment, the annular region 24 is divided into three adjacent channels which are separated by elongated partitions 32, 34 and 35 of porous acoustical material, such as glass wool. In FIG. 1, only two partitions denoted 32 and 34 are shown, although all three may be seen in FIG. 2. The partitions are generally tapered from upstream to downstream end and have a dimension equal to the radicl distance between sections 20 and 22 in the radial direction. The channels extend from a point near the upstream end of sections 20 and 22 to an intermediate point denoted by their reference designation X in FIG. 1 in the region 24. Beyond the channels in region 24 is a substantially annular common plenum 36 which is coupled to the branch duct by means of a butt joint 38.

Each channel acts like an acoustically lined duct, with two opposite sides lined. Since the porous partitions in the annular region 24 can be made quite thick, such as eight inches in typical thirty-six inch diameter duct, the attenuation of the device can be more than adequate throughout the entire frequency range of interest. Thus, the resultant attenuation is comparable to that of a large fan silencer. Unlike the fan silencer, however, the present invention can be increased in length without the need for additional space.

The frequency dependence of the acoustic attenuation of the device may readily be adjusted by variations in the width of the channels (i.e. the distance between the two porous walls in the channel), and the thickness and number of the porous partitions in the annular section. The density of the porous material is also a parameter which can be chosen independently of the others. In the preferred embodiment, the density is selected such that the acoustic flow resistance per inch of the material is between 50 and 10 CGG units, generally corresponding to a density of about six pounds per cubic foot. The required length, L, for the channel is less than ⅓ of the product of the width of the channel, W, and the desired attenuation, A. The details of the frequency dependence of the attenuation may be determined from well-known procedures for lined ducts.

In the illustrated embodiment, the channels in through section 24 are relatively straight. In response to airflow A, a relatively high static pressure is built up in region 36, with this high static pressure driving airflow into the branch duct to form a branch airflow denoted by reference designation C. The remaining portion of the main airflow exits into the output duct and is denoted in FIG. 1 by reference designation B.

Figure 6:
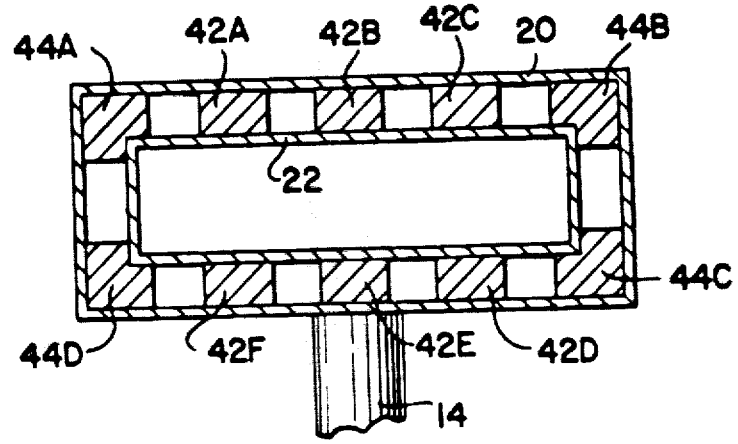

FIGS. 5–6 and FIGS. 7–9 illustrate further embodiments of the present invention. In those figures, elements corresponding to similar elements in the embodiment of FIGS. 1–4 are identified with the same reference designations. FIGS. 5 and 6, show a form of the invention suitable for coupling rectangular input and outputs ducts. In still other embodiments, ducts may have alternative polygonal cross-section shapes.

In the embodiment of FIGS. 5 and 6, the channel forming members 42A–42F are substantially the same shape as the corresponding member 32 in the above-described embodiment, except the top and bottom surfaces are planar for members 42A–42F in order to provide a flush fit with the inner and outer surfaces of sections 20 and 22, respectively. In FIGS. 5–6, there are four corner channel forming members 44A–44D which extend to the point X as to the members 42A–42F, with the members 44A–44D forming broadening channels for airflow in the shell region 24. The plug 26 has rectangular inner and outer surfaces to provide a seal at the end of the overlapping portions of inner and outer sections 20 and 22.

In operation, the embodiment of FIGS. 5 and 6 operates substantially in the same manner as the embodiment of FIGS. 1–4, with a static pressure build-up in plenum 36 driving airflow tapped from the main stream into the branch duct 14. Similarly, the remaining portion of the main stream is represented by flow arrow B into the output duct 12.

Figure 7:
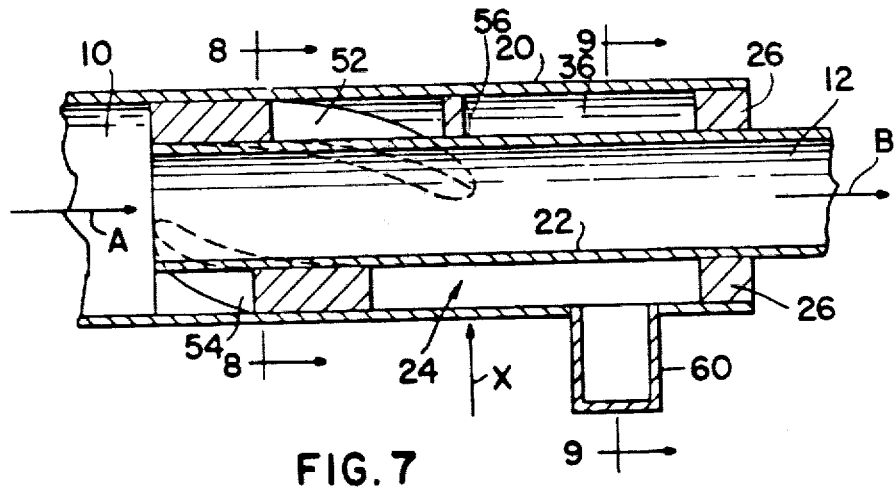
Figure 8:
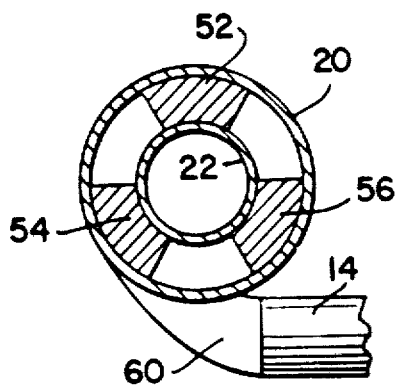
Figure 9:
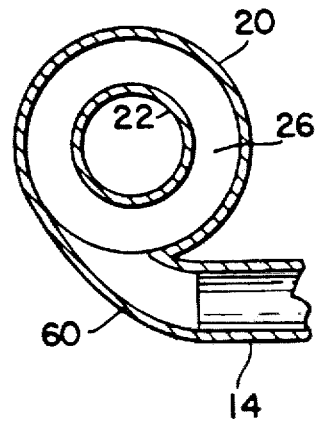

The embodiment of FIGS. 7–9 illustrates another embodiment suitable for coupling an airstream in an input duct 10 (represented by arrow A) to a branch duct 14 (arrow C) with the remainder of the airsteam continuing to the output duct 12 (arrow B).

This latter embodiment is substantially similar to that in FIGS. 1–4 except that the partitions 52, 54 and 56 are adapted to form channels in the shell region 24 having substantially helical central axes extending from the portion of the shell region adjacent to input duct 10 to the intermediate point X. At the point X, the central axes of these channels are substantially parallel to a plane passing through point X and being perpendicular to the common axis of sections 20 and 22. Thus, in this embodiment, the channel axes are generally helical with a pitch varying from infinite at the input and to zero at the output end.

With this configuration, air tapped from the input duct 10 and passing through the shell region 24 is directed to flow circumferentially in the plenum 36 (in the counter-clockwise direction viewed from duct 10 in the embodiment of FIGS. 7–9). A junction 60 is provided to tap off the airflow from the flow direction in plenum 36 and couple that airflow to the branch duct 14. For this junction, conventional techniques may be utilized, such as those found in centrifugal fans, for example. In this embodiment, the velocity pressure of the airstream moving in the direction flow of plenum 36 drives the tapped air through junction 60 to the branch duct 14. In alternative embodiments, the junction section 60 may provide fully tangential take-off of the air-flow from the plenum. In such embodiments the outer wall 61 of section 60 is substantially planar and is tangent to the section 20 where joining that section.

In all the above embodiments, only a single branch duct 14 is illustrated, although in other embodiments, additional branch ducts may be incorporated similarly.

In the illustrated embodiments, the partitions forming the channels are tapered, and provide widening channels in the straight channel embodiments, and substantially uniform width channels in the helical embodiments. In alternative embodiments, the partitions in the shell region may establish the channels having substantially uniform width. In such cases, in helical channel embodiments, the channels are tapered, while in the straight channel embodiments the channels are uniform width.

FIGS. 10 and 11 show other alternative configurations adapted for coupling an input duct with an output duct and a single branch duct. In those figures, elements having corresponding elements in the configurations of FIGS. 1-9 are identified by the same reference designations.

In FIG. 10, a branch take-off and silencer device is shown with a similar cross-section inner section 22 and outer section 20 defining a shell region 24. The sections 20 and 22 are substantially coaxial. In this embodiment, section 22 is formed by an extension of the output duct. In alternative forms, section 22 may be separate from the output duct but joined at the downstream end to that duct.

In the illustrated embodiment, a single airflow channel 60 is established in the shell region 24 by a partition member 62 which fills the shell region 24, except for the channel 60. The partition member 62 is preferably a porous acoustical material, such as glass wool. This channel is adapted at its upstream end to receive a portion of the oncoming airflow (indicated by arrow A) in the input duct 10 (not shown). This portion of the airflow in the shell region 24 passes along the longitudinal, or central, axis of channel 60 and exits to the branch duct 14 near the downstream end of region 24.

In the present embodiment, at the upstream end of channel 60, that channel's central axis is parallel to the central axis of input duct 10, and at the downstream end of channel 60, that channel's central axis is parallel to the central axis of branch duct 14. In FIG. 10, only one channel is established for coupling to the single duct 14, although additional channels may similarly be coupled to additional output ducts in other embodiments. In alternate embodiments, a rectangular-to-circular cross-section converter may be used to match the rectangular channel 60 to a circular branch duct.

The configuration of FIG. 11 is particularly adapted for a rectangular cross-section output duct. As shown in FIG. 11, the output duct 12 includes a rectangular cross-section extension section 22. A rectangular cross-section outer section 20 overlaps the extension section 22. The dimensions of these sections 20 and 22 are adapted so that section 22 fits snugly within section 20 along three sides and provides a shell region 24 along the fourth side. A single airflow channel 70 is established in the shell region 24 by partition members 72 and 74. Preferably members 72 and 74 are formed from a porous acoustic material. The channel 70 is adapted to receive a portion of the oncoming airflow (indicated by arrow A) in the input duct 10 (now shown). This portion of the airflow in the shell region 24 exits to the branch duct 14 near the downstream end of region 24. In alternate forms, additional channels may be established in region 24, or in additional similar regions which may be similarly formed along other sides of the overlapping sections 20 and 22. In addition, this form of the invention may be used with other overlapping polygonal cross-section sections, where the shell region is established between one pair of planar faces of the inner and outer sections. In still other embodiments, additional channels which lead to additional branch ducts may be established in that shell region or in similar shell regions between additional pairs of planar faces of the inner and outer sections.

Although the present embodiments have been described in terms of overlapping input and output ducts, functionally equivalent interface ducts may be used to couple those input and output ducts. In addition, while rectangular and circular cross-section ducts have been described, it will be understood that other cross-section shapes may similarly be utilized within the scope of the invention. For example, overlapping elliptical ducts may be used in one such form.

The take-off and silencer (TO/S) devices shown in FIGS. 10 and 11 may be used in one form where the input duct 10 has substantially the same cross-section as the upstream end of outer section 24. In another form, the TO/S device of FIG. 10 may be used in accordance with the present invention with a static pressure regain (SPR) coupler between the input duct 10 and the upstream end of the TO/S device. The latter form is particularly advantageous where the input duct 10 and output duct 12 have substantially the same cross-sections.

In this form, the SPR coupler defines an airflow port at its upstream end having substantially the same cross-section as the TO/S inner section 22. This end of the SPR coupler is directly coupled to the input duct 10. In addition, the SPR coupler defines an airflow port at its downstream end which has substantially the same cross-section as the TO/S inner section and in addition includes a port extending from a channel from the interior of the SPR coupler inner section. This latter port is adapted to couple to one or more of the channels in the TO/S shell region. The SPR coupler may be a discrete element or may be intergral with the TO/S device. With this configuration, the airflow velocity decreases as the flow passes from the input duct to the output duct resulting in a static pressure gain along that path. A relatively minor portion of the flow from the input duct is tapped off to the channels leading to the branch ducts.

FIG. 12 shows an exemplary SPR coupler 80 for use at the input end of the TO/S configuration of FIG. 11. That exemplary device 80 includes a rectangular port 82 at its upstream end for coupling to rectangular input duct 10, a rectangular port 84 for coupling to inner section 22, and a rectangular port 86 for coupling to channel 70. As shown, port 86 terminates an airflow guide (or channel) 88 formed by the walls of the top portion of coupler 80 which bound that channel adapted to pass a relatively small portion of the input airflow (at port 82) to channel 70 of the take-off/silencer device of FIG. 11, thereby establishing the flow denoted "C" in that figure. Port 84 terminates an airflow guide (formed by the side, top and bottom walls of SPR coupler 80, and channel 88) adapted to run a relatively large portion of the input air flow (at port 82) to the main duct portion of the take-off/silencer of FIG.

11, thereby establishing the flow denoted "B" in that figure. In the illustrated form, the channel 88 is formed by the upper (as shown) surface of the device 80. FIG. 13 shows an alternative form of device 80, having a similar channel 88 established by acoustic materials 92 which may be positioned within a shell region 96 (similar to region 24 in the TO/S device) established by housing member 98.

In various applications, the SPR coupler may be utilized immediately adjacent to the upstream end of a TO/S device, as suggested above in conjunction with FIGS. 11 and 12. Alternatively, the SPR coupler may be coupled to the upstream end of a TO/S by an extended coupling duct. In the latter form, a number of TO/S devices may be deployed in series, with the downstream end of each such device being directly coupled to the SPR coupler for the next TO/S device, which in turn is coupled to that TO/S device by such an extended duct.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for coupling an airstream from an input duct to an output duct and at least one associated channel, comprising:
   A. an input port having a cross-section substantially the same as the cross-section of said input duct and adapted to receive substantially all the air in said airstream,
   B. an output port having a cross-section including at least two parts, the first of said parts having a substantially the same cross-section at its downstream end as said output duct and the second of said parts having substantially the same cross-section at its downstream end as said associated channel, wherein said second part is contiguous to said first part,
   C. a first airflow guide having lateral side walls defining said first part, said first airflow guide being adapted to pass a first portion of said received air through said first part to said output duct,
   D. a second airflow guide having lateral side walls defining said second part, said second airflow guide being adapted to pass a second portion of said received air through said second part to said associated channel.

2. Apparatus according to claim 1 wherein said first airflow guide includes an inner section defining an airflow path between said input port and said first output port, and
   wherein said second airflow guide includes an outer section defining a shell region adjacent to the exterior of said inner section, and a channel means for defining an airflow path from the interior of said inner section to said second output port.

3. Apparatus according to claim 2 wherein said channel means is a porous acoustic material.

4. Apparatus for coupling an airstream from an end of an input duct to an end of an output duct and at least one branch duct, comprising:
   A. a branch take-off and silencer means, including i. an inner section having a cross-section substantially the same as the cross-section of said output duct, said inner section being adapted for coupling at one end to said end of said output duct,
   ii. an outer section disposed about at least a portion of said inner section and defining a shell region between said inner section portion and said outer section,
   iii. channel means for establishing at least one channel in said shell region, said channel extending from a point near the end of said shell region adjacent to said input duct to said end of said branch duct, and
   B. coupling means, including
   i. an input port having a cross-section substantially the same as the cross-section of said input duct, and adapted to receive substantially all the air in said airstream,
   ii. an output port having a cross-section including at least two parts, the first of said parts having substantially the same cross-section at its downstream end as said output duct and the second of said parts having substantially the same cross-section at its downstream end as said associated channel, wherein said second part is contiguous to said first part,
   iii. a first airflow guide having lateral sidewalls defining said first part, said first airflow guide being adapted to pass a first portion of said received air through said first part to said output duct,
   iv. a second airflow guide having lateral sidewalls defining said second part, said second airflow being adapted to pass a second portion of said received air through said second part to said associated channel.

5. Apparatus according to claim 4 wherein said first airflow guide includes an inner section defining an airflow path between said input port and said first output port, and
   wherein said second airflow guide includes an outer section defining a shell region adjacent to the exterior of said inner section, and a channel means for defining an airflow path from the interior of said inner section two said second output port.

6. Apparatus according to claim 5 wherein said channel means is a porous acoustic material.

7. Apparatus for coupling an airstream from an end of an input duct to an end of an output duct and at least one branch duct, comprising:
   A. an inner section having a cross-section substantially the same as the cross-section of said output duct, said inner section being adapted for coupling at one end to said end of said output duct,
   B. an outer section disposed about at least a portion of said inner section and defining a shell region between said inner section portion and said outer section,
   C. channel means for establishing at least one channel in said shell region, said channel extending from a point near the end of said shell region adjacent to said input duct to said end of said branch duct.

8. Apparatus according to claim 7 wherein said input and output ducts have circular cross-sections at said ends to be coupled, whereby said channel has a curved central axis extending from its input end near said input duct to its output end near said branch duct, said central axis being parallel to said input duct central axis at the input end of said channel, and being parallel to said branch duct central axis at the output end of said channel.

9. Apparatus according to claims 7 or 8 wherein said channel means comprises a sound absorbing element disposed within said shell region.

10. Apparatus according to claim 8 wherein said input and output ducts have polygonal cross-sections at said ends to be coupled.

11. Apparatus according to claim 10 wherein said shell region is established between one pair of parallel planar faces of said inner and outer sections.

* * * * *